(12) United States Patent  (10) Patent No.: US 9,200,424 B2
Ditzler                    (45) Date of Patent:     Dec. 1, 2015

(54) BOOM APPARATUS WITH SANDWICHED KNUCKLE BODY

(71) Applicant: Steven J. Ditzler, Bellevue, IA (US)

(72) Inventor: Steven J. Ditzler, Bellevue, IA (US)

(73) Assignee: DEERE & COMPANY, One John Deere Place, Moline, IL (US)

( * ) Notice: Subject to any disclaimer, the term of this patent is extended or adjusted under 35 U.S.C. 154(b) by 395 days.

(21) Appl. No.: 13/755,845

(22) Filed: Jan. 31, 2013

(65) Prior Publication Data

US 2013/0142607 A1    Jun. 6, 2013

Related U.S. Application Data

(63) Continuation-in-part of application No. 13/236,935, filed on Sep. 20, 2011, now Pat. No. 9,121,163.

(51) Int. Cl.
*E02F 3/38*    (2006.01)
*A01D 34/86*   (2006.01)
*E02F 9/00*    (2006.01)
*E02F 9/22*    (2006.01)

(52) U.S. Cl.
CPC ............. *E02F 3/38* (2013.01); *A01D 34/866* (2013.01); *E02F 9/006* (2013.01); *E02F 9/2275* (2013.01)

(58) Field of Classification Search
CPC ........... E02F 3/38; E02F 3/382; E02F 3/384; E02F 9/14; E02F 9/006; E02F 9/2275; Y10S 14/131; A01D 34/866
USPC ........... 52/111, 166; 414/543, 680, 685, 686, 414/687, 691, 694, 695.5, 722, 723, 727, 414/918
See application file for complete search history.

(56) References Cited

U.S. PATENT DOCUMENTS

| 3,295,699 | A |   | 1/1967  | Bauernschub, Jr. |
| 3,616,940 | A |   | 11/1971 | Milner, Jr. |
| 4,193,734 | A | * | 3/1980  | Williams ............... 414/694 |
| 4,260,064 | A |   | 4/1981  | Ekstam |
| 5,806,313 | A |   | 9/1998  | Koshi et al. |
| 6,322,280 | B1 |  | 11/2001 | Coyne |
| 6,443,196 | B1 |  | 9/2002  | Kurelek |
| 6,612,051 | B2 |  | 9/2003  | Weyer et al. |
| 6,872,043 | B2 |  | 3/2005  | Yukawa et al. |
| 7,008,169 | B1 |  | 3/2006  | Miyanishi |
| D646,306  | S | * | 10/2011 | Bradley et al. ........... D15/32 |
| 2009/0223093 | A1 | * | 9/2009 | Willaredt et al. ......... 37/403 |
| 2010/0119344 | A1 | * | 5/2010 | Nabata et al. ........... 414/722 |

(Continued)

FOREIGN PATENT DOCUMENTS

IN         239227         9/2011

OTHER PUBLICATIONS

Notification of Transmittal of the International Search Report and the Written Opinion of the International Searching Authority, or the Declaration; International Search Report; Written Opinion of the International Searching Authority (10 pages) (Mar. 28, 2013).
Images of Deere Boom (2 pages) (admitted as prior art before Sep. 20, 2011).

(Continued)

*Primary Examiner* — Ernesto Suarez
*Assistant Examiner* — Brendan Tighe

(57) ABSTRACT

A boom apparatus comprises a first boom, a second boom, and a monolithic knuckle body. The knuckle body is included in a clevis attaching pivotally the first boom and the second boom.

10 Claims, 8 Drawing Sheets

(56) References Cited

U.S. PATENT DOCUMENTS

2012/0241404 A1    9/2012   Bobeck
2014/0056677 A1*   2/2014   Takahashi et al. ............ 414/727

OTHER PUBLICATIONS

Background Information (1 page) (admitted as prior art before Sep. 20, 2011).
Report of Indian Design Patent No. 239227 (1 page) (Sep. 5, 2011).

* cited by examiner

BOOM APPARATUS WITH SANDWICHED KNUCKLE BODY

FIELD OF THE DISCLOSURE

The present disclosure relates to a boom apparatus. In particular, it relates to a clevis of the boom apparatus.

BACKGROUND OF THE DISCLOSURE

There are forestry machines that have a boom apparatus. The boom apparatus has a first boom and a second boom. The first and second booms are attached to one another by use of a clevis.

SUMMARY OF THE DISCLOSURE

According to an aspect of the present disclosure, a boom apparatus comprises a clevis pin, a first boom, and a second boom. The first boom and the second boom are attached pivotally to one another at a knuckle of the boom apparatus by use of the clevis pin. The first boom comprises a first side wall, a second side wail spaced apart from the first side wall laterally of the first boom, a top wall, a bottom wall spaced apart from the top wall, and a monolithic knuckle body. The top wall and the bottom wall interconnect the first side wall and the second side wall. The first side wall, the second side wall, the top wall, and the bottom wall cooperate to define a periphery of a box structure of the first boom. The first side wall and the second side wall extend longitudinally of the first boom beyond the box structure to provide respectively a first wall extension and a second wall extension.

The knuckle body is positioned at a knuckle end portion of the first boom. The knuckle body is attached to and sandwiched between the first and second wall extensions. The knuckle body comprises a barrel, a first body ear, and a second body ear. The barrel is attached to the top and bottom walls and the first and second wall extensions so as to close an end portion of the box structure. The first body ear and the second body ear extend from the barrel longitudinally of the first boom respectively along the first wall extension and the second wall extension. The clevis pin is received in a first pin-receiving bore defined at least partially in the first body ear and the first wall extension and a second pin-receiving bore defined at least partially in the second body ear and the second wall extension such that the knuckle body, the clevis pin, and the first and second wall extensions are included in a clevis of the knuckle.

The above and other features will become apparent from the following description and the coupled drawings.

BRIEF DESCRIPTION OF THE DRAWINGS

The detailed description of the drawings refers to the accompanying figures in which.

DETAILED DESCRIPTION OF THE DRAWINGS

Figure 1:
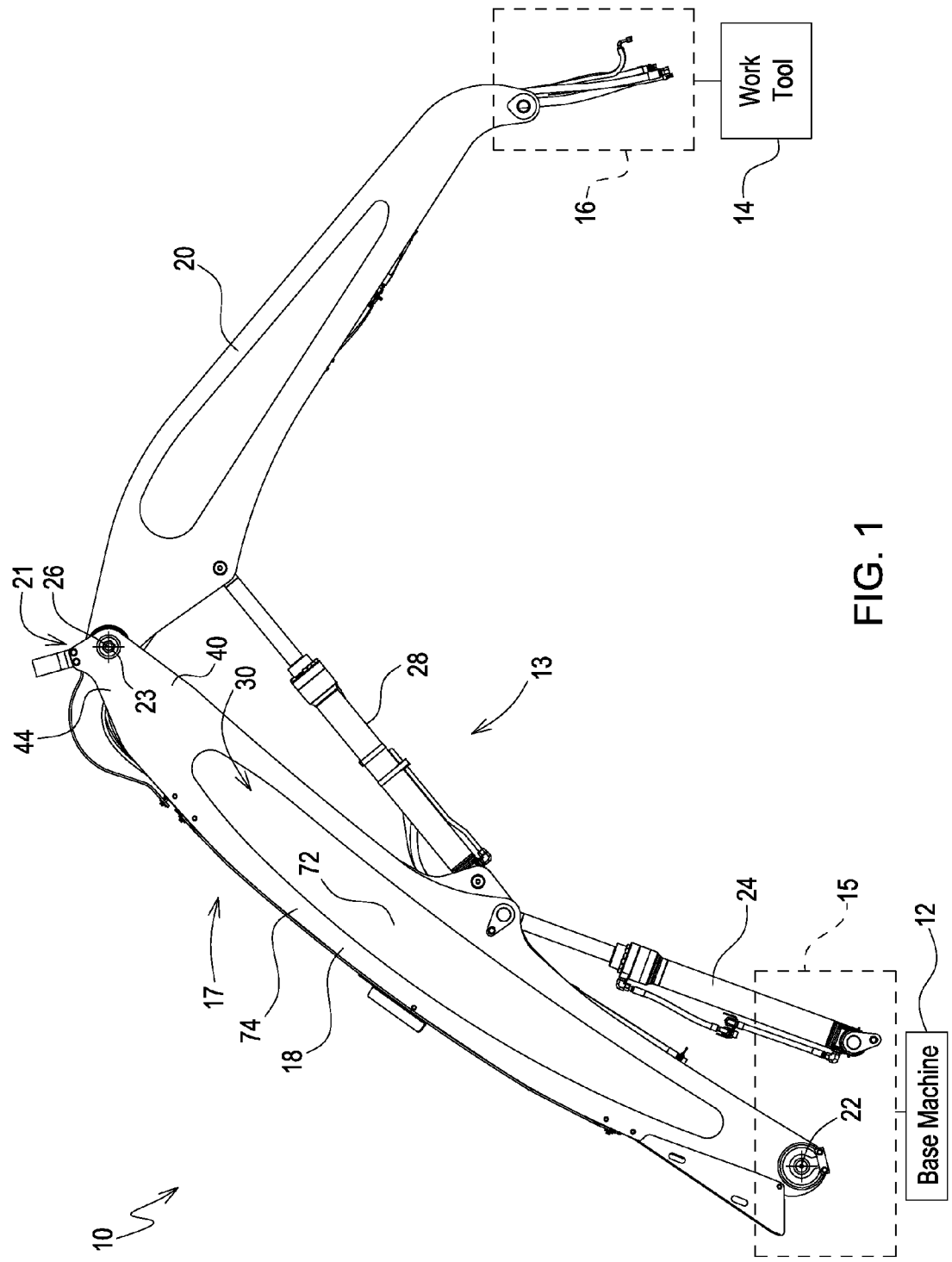
FIG. 1 is an elevation view showing a boom apparatus attached to a diagrammatic base machine and a diagrammatic work tool.

Referring to FIG. 1, an exemplary work machine 10 comprises a base machine 12, a boom apparatus 13, and a work tool 14. The work machine 10 may be any of a variety of work machines.

The work machine 10 may be a forestry machine. In such a case, the base machine 12 may be, for example, a tracked feller buncher or a wheeled or tracked harvester. The work tool 14 may be a hydraulically-actuated forestry attachment, such as, for example, a disk saw felling head, a harvesting head, a debarking head, a cutting head, a delimber, a tree handling device, or a combination thereof, to name but a few forestry attachments. The boom apparatus 13 is illustrated, for example, as a boom apparatus for a forestry harvester, it being understood that the boom apparatus 13 may be configured for a wide variety of work machines. In such a case, the work tool 14 may be, for example, a harvesting head.

The boom apparatus 13 comprises a first end portion 15 and a second end portion 16. The first end portion 15 is attached to the base machine 12, and the work tool 14 is attached to the second end portion 16. As such, the second end portion 16 is the working end portion, or nose, of the boom apparatus 13.

The boom apparatus 13 comprises a heavy duty boom structure 17. Exemplarily, the boom structure 17 comprises a first or hoist boom 18 and a second or stick boom 20. The first boom 18 is attached pivotally to the base machine 12 for pivotal movement of the first boom 18, and thus the boom structure 17, relative to the base machine 12 about a first boom pivot axis 22. Each of the booms 18, 20 is configured, for example, as a weldment.

The first and second booms 18, 20 are attached pivotally to one another at a knuckle 21 of the boom apparatus 13. The second boom 20 is attached pivotally to the first boom 18 for pivotal movement of the second boom 20 relative to the first boom 18 about a second boom pivot axis 26. The first boom 18 and the second boom 20 are attached pivotally to one another at a knuckle 21 of the boom apparatus 13 by use of a clevis pin 23 of a clevis 57 of the knuckle 21.

The boom apparatus 13 comprises two hoist cylinders 24 configured as two fluid cylinders (e.g., hydraulic cylinders). The hoist cylinders 24 are attached pivotally to the base machine 12 and the first boom 18 to raise and lower the first boom 18, and thus the boom structure 17, relative to the base machine 12 about the first boom pivot axis 22.

The boom apparatus 13 comprises a stick cylinder 28 configured as a fluid cylinder (e.g., hydraulic cylinder). The stick cylinder 28 is attached pivotally to the first boom 18 and the second boom 20 to pivot the second boom 20 relative to the first boom 18. The cylinder 28 is so attached to pivot the second boom 20 relative to the first boom 18 about the second boom pivot axis 26.

Referring to FIGS. 2-5, the first boom 18 comprises a first side wall 30, a second side wall 32 spaced apart from the first side wall 30 laterally of the first boom 18, a top wall 34, and a bottom wall 36 spaced apart from the top wall 34 depth-wise of the first boom 18. The top wall 34 and the bottom wall 36 interconnect and are welded to the first side wall 30 and the second side wall 32. The first side wall 30, the second side wall 32, the top wall 34, and the bottom wall 36 cooperate to define a periphery 38 of a box structure 39 of the first boom 18. The structure 39 is hollow given that it has a box shape. The first side wall 30 and the second side wall 32 extend longitudinally of the first boom 18 beyond the box structure 39 to provide respectively a first wall extension 40 and a second wall extension 41.

The first boom 18 comprises a monolithic (one-piece) knuckle body 42. The knuckle body 42 is positioned at a knuckle end portion 44 of the first boom 18. The knuckle body 42 bridges a width 51 between (inclusively) the first and second wall extensions 40, 41 laterally of the first boom 18.

The knuckle body 42 is sandwiched between the first and second wall extensions 40, 41. Such a configuration may promote stress minimization and part count economy in a clevis 57 of the boom apparatus 13.

Referring to FIGS. 3, 5, and 6-9, the knuckle body 42 comprises a barrel 46, a first body ear 48, and a second body ear 50. The barrel 46 and the first and second body ears 48, 50 are sandwiched between the first and second wall extensions 40, 41 such that the knuckle body 42 bridges the width 51. The barrel 46 is attached to the top and bottom walls 34, 36 and the first and second wall extensions 40, 41 (e.g., welded) so as to close an end portion 52 of the box structure 39. The first body ear 48 and the second body ear 50 extend from the barrel 46 longitudinally of the first boom 18 respectively along the first wall extension 40 and the second wall extension 41. The clevis pin 23 is received in a first pin-receiving bore 53 defined at least partially in the first body ear 48 and the first wall extension 40 and a second pin-receiving bore 54 defined at least partially in the second body ear 50 and the second wall extension 41 such that the knuckle body 42, the clevis pin 23, and the first and second wall extensions 40, 41 are included in the clevis 57 of the knuckle 21.

Exemplarily, the knuckle body 42 is a casting made, for example, of cast steel. Further exemplarily, the casting is a shell, closed by the wall extensions 40, 41 as part of the sandwiching of the knuckle body 42 by the side walls 30, 32.

The barrel 46 comprises a first barrel end portion 55, a second barrel end 56 portion spaced axially apart from the first barrel end portion 55 relative to a central axis 58 of the barrel 46, and a tubular portion 60 interconnecting the first and second barrel end portions 55, 56. The first barrel end portion 55 is welded to the first wall extension 40. The second barrel end portion 56 is welded to the second wall extension 41. The tubular portion 60 is welded to the top and bottom walls 34, 36. The barrel 46 is hollow for weight reduction, and thus comprises the tubular portion 60.

Exemplarily, the barrel 46 is generally spool-shaped. As such, the first barrel end portion 55 is configured as a first flared end portion or lip extending radially from and circumferentially about the tubular portion 60 and welded to the first wall extension 40 and to the top and bottom walls 34, 36, and the second barrel end portion 56 is configured as a second flared end portion or lip extending radially from and circumferentially about the tubular portion 60 and welded to the second wall extension 41 and to the top and bottom walls 34, 36.

The first and second body ears 48, 50 extend parallel to one another in a common direction 62 from the barrel 46. The first and second body ears 48, 50 taper as they extend in the common direction 62 from the barrel 46.

Each of the first and second body ears 48, 50 comprises a web 64 that tapers as it extends from the barrel 46 and a collar 66 that is distal from the barrel 46 and protrudes laterally inwardly from the web 64 laterally of the first boom 18. The collar 66 of the first body ear 48 cooperates with the first wall extension 40 to define the first pin-receiving bore 53, and the collar 66 of the second body ear 50 cooperates with the second wall extension 41 to define the second pin-receiving bore 54.

The web 64 of the first body ear 48 merges with and extends from the first flared end portion, and the web 64 of the second body ear 50 merges with and extends from the second flared end portion. The first flared end portion provides the first barrel end portion 55, and the second flared end portion provides the second barrel end portion 56.

The boom apparatus 13 comprises at least one flexible line 68 routed through a passageway 70. Illustratively, there are several such flexible lines 68 (e.g., hydraulic and electrical lines). The passageway 70 is defined between the barrel 46 and the clevis pin 23 and between the first and second body ears 48, 50.

Each of the first and second side walls 30, 32 comprises a laterally inner plate 72 and a laterally outer plate 74. The plates 72, 74 are welded to one another and to the top and bottom walls 34, 36 (each configured, for example, as a plate). Each of the inner plates 72 is welded to the respective flared end portion of the barrel 46. The outer plate 74 of the first side wall 30 provides the first wall extension 40, and the outer plate 74 of the second side wall 32 provides the second wall extension 41. The outer plates 74 extend the length of the boom 18.

Figure 2:
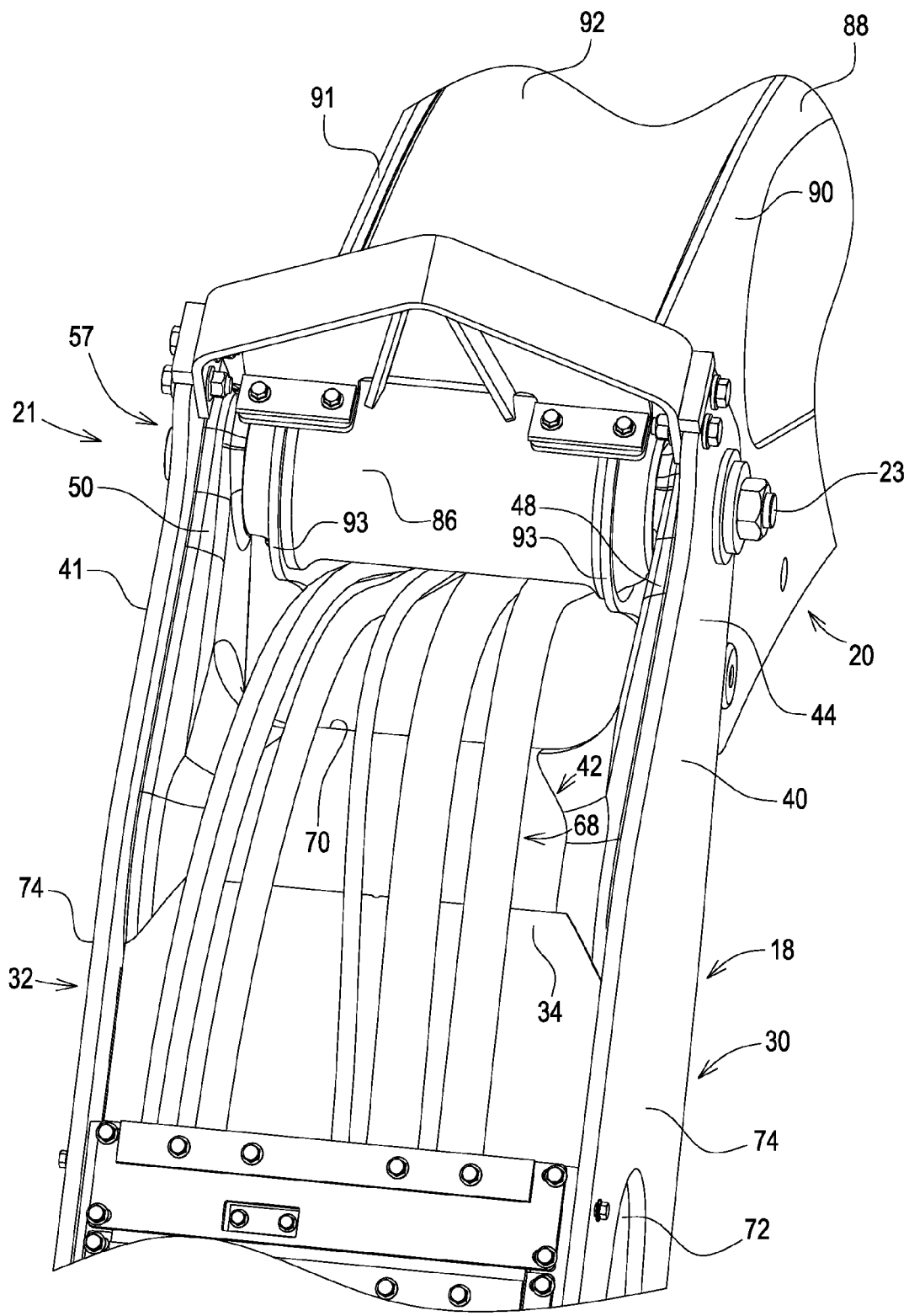
FIG. 2 is a perspective view of the boom apparatus, with portions broken away, showing a first boom, a second boom, and a clevis pivotally interconnecting the first and second booms.
Figure 3:
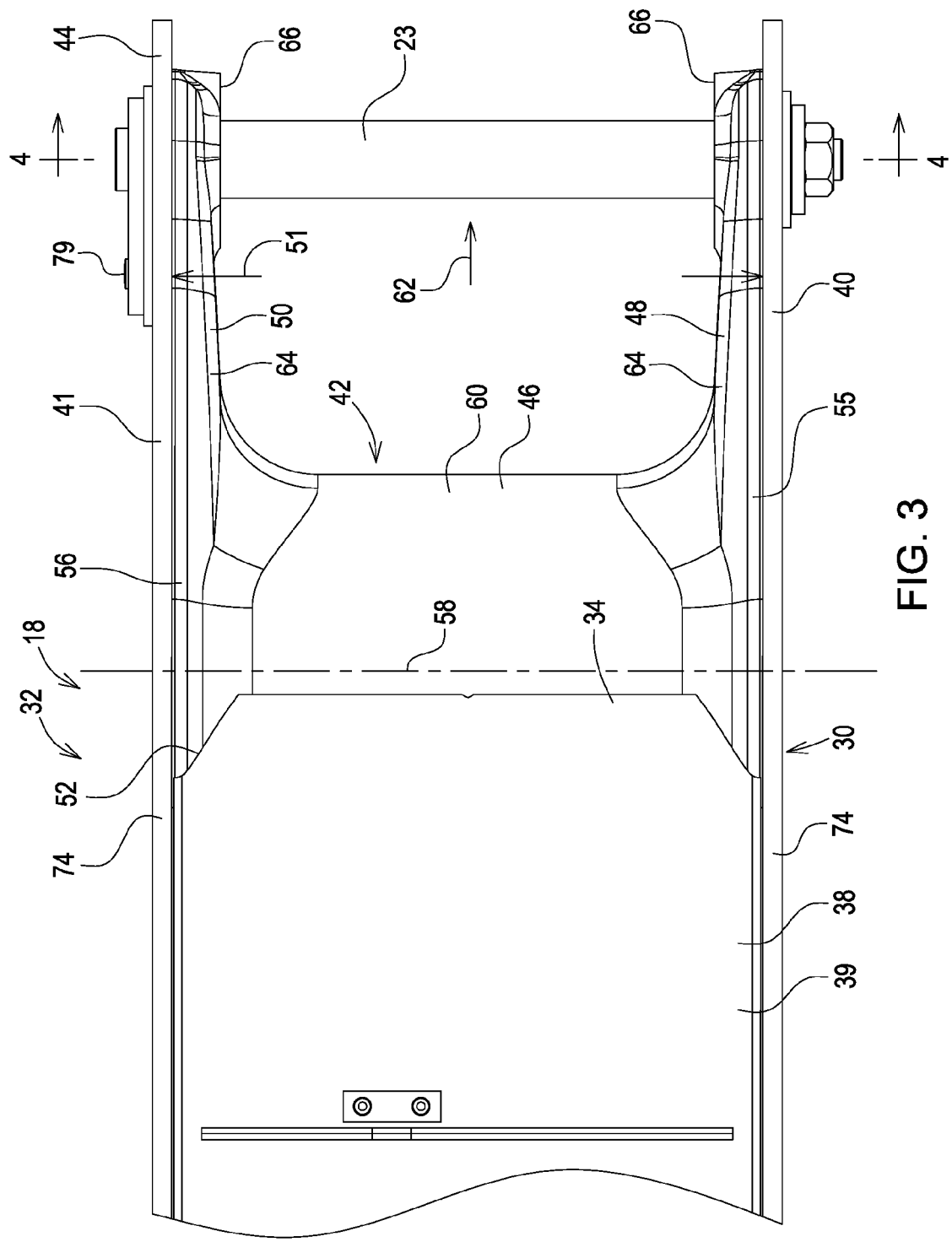
FIG. 3 is a top view of the boom apparatus, with portions broken away, showing a monolithic knuckle body of the clevis sandwiched between first and second wall extensions of the first boom.
Figure 4:
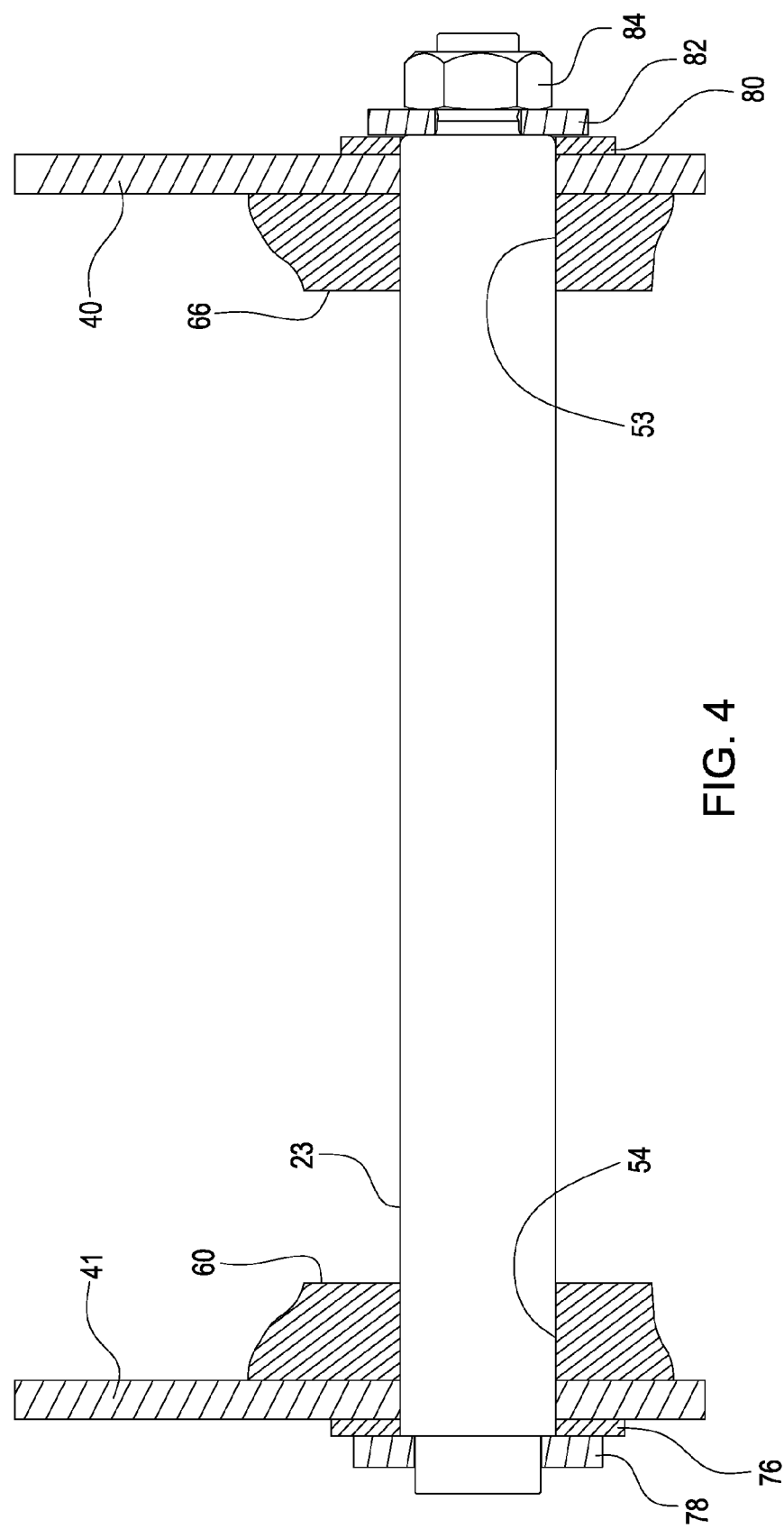
FIG. 4 is a sectional view, taken along lines 4-4 of FIG. 3.
Figure 5:
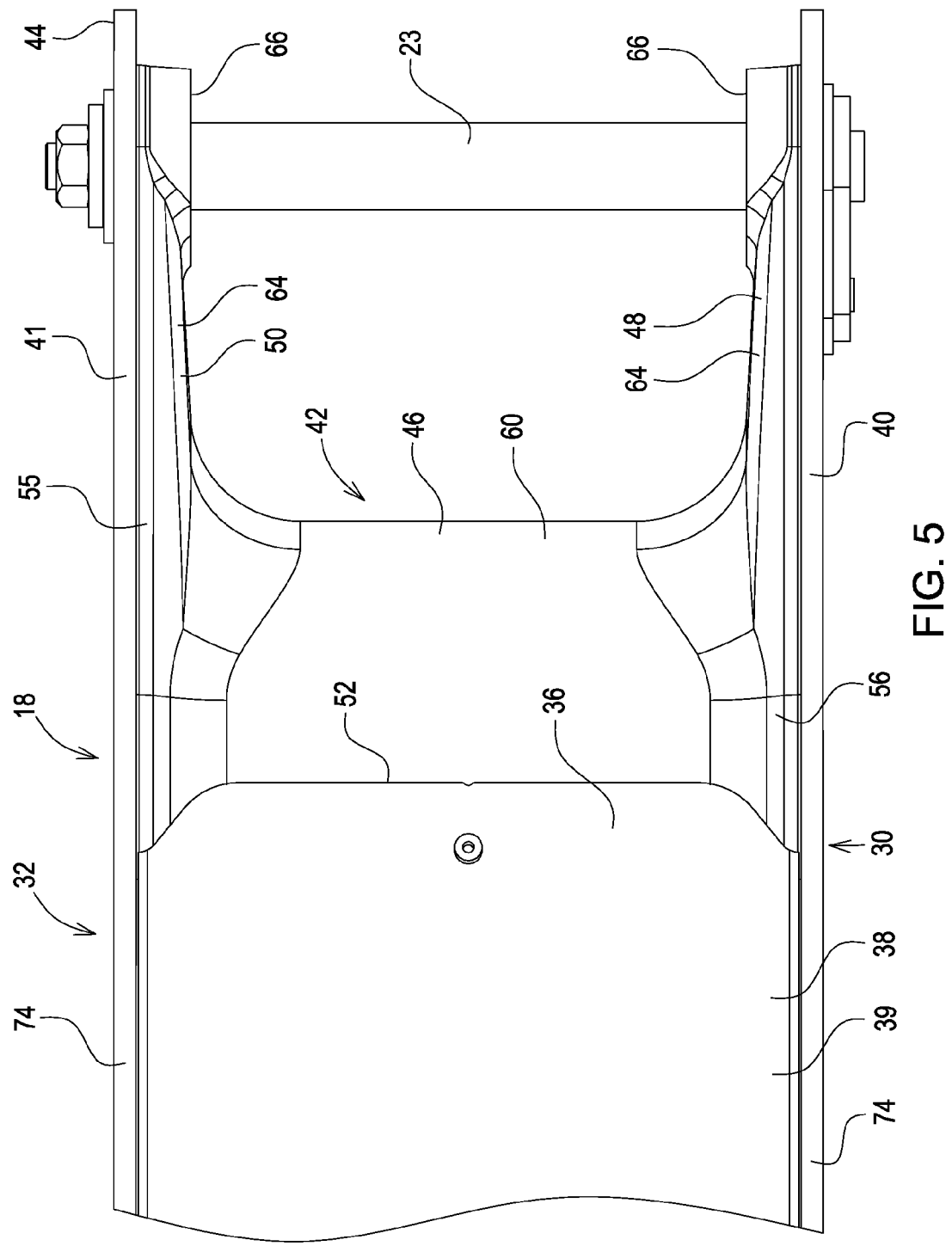
FIG. 5 is a bottom view of the boom apparatus, with portions broken away, showing the knuckle body sandwiched between the first and second wall extensions.
Figure 6:
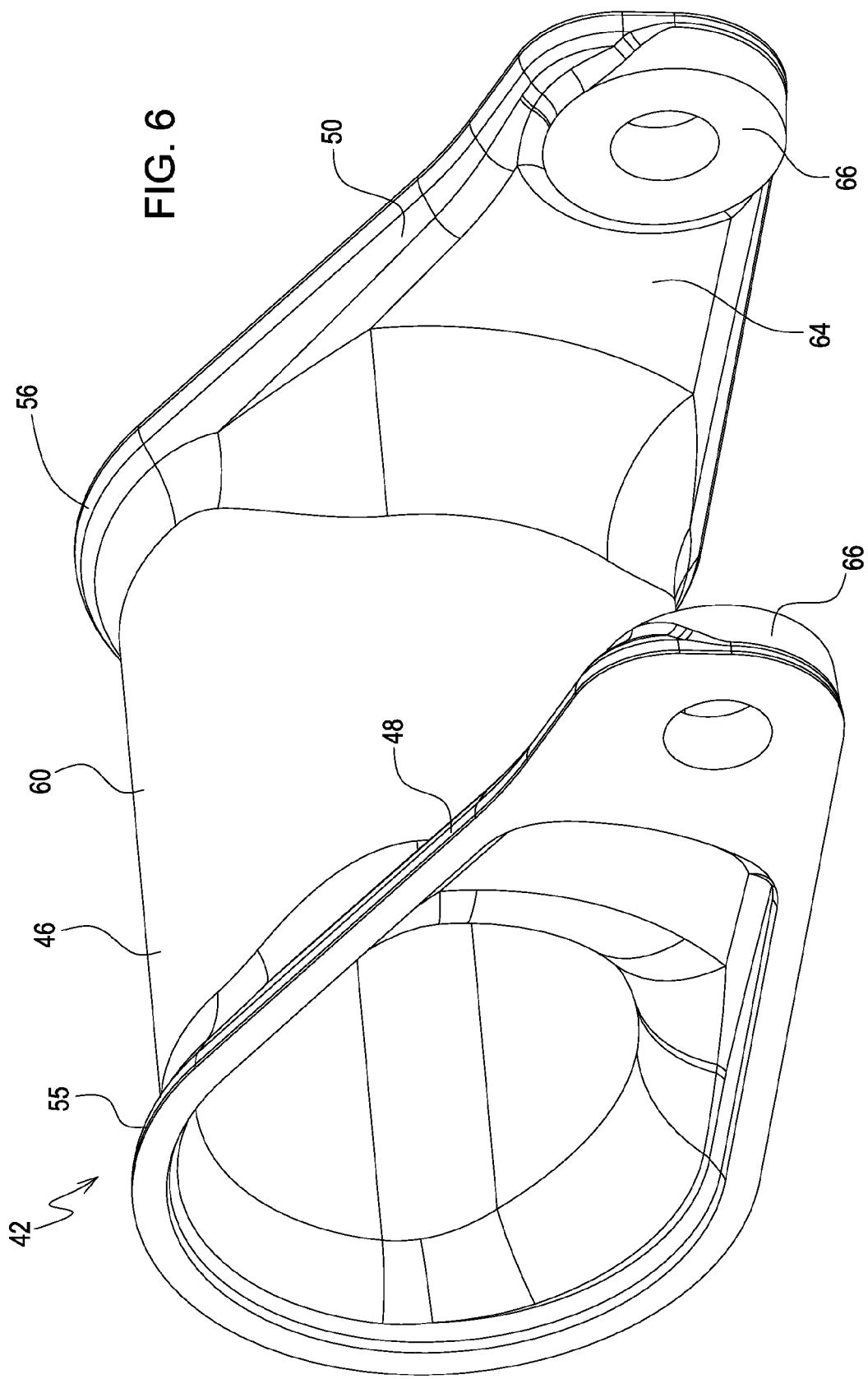
FIG. 6 is a perspective view of the knuckle body.
Figure 8:
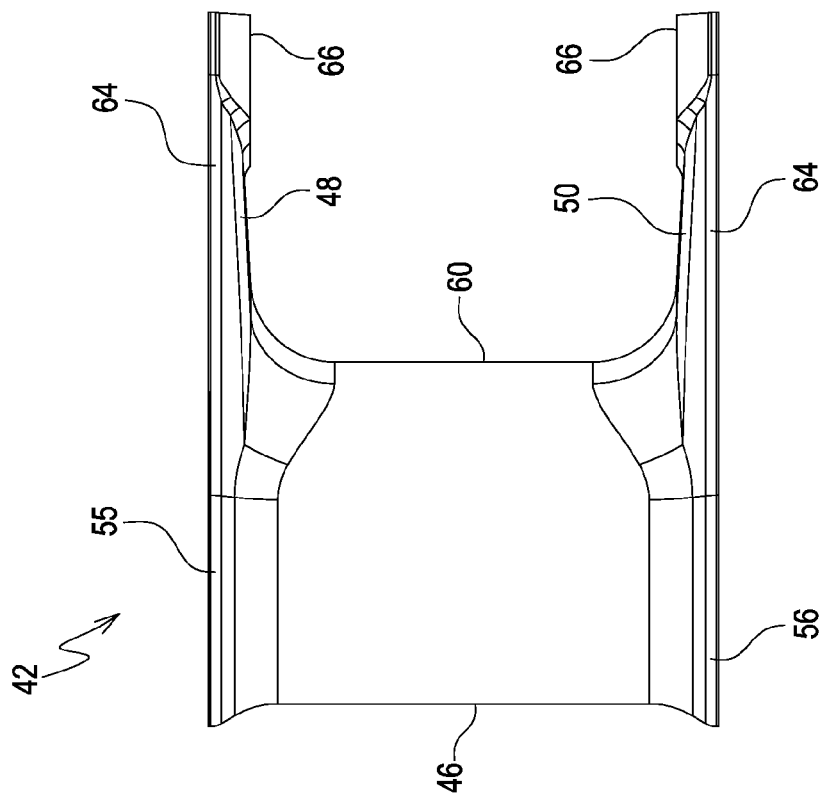
FIG. 8 is a bottom view of the knuckle body.
Figure 7:
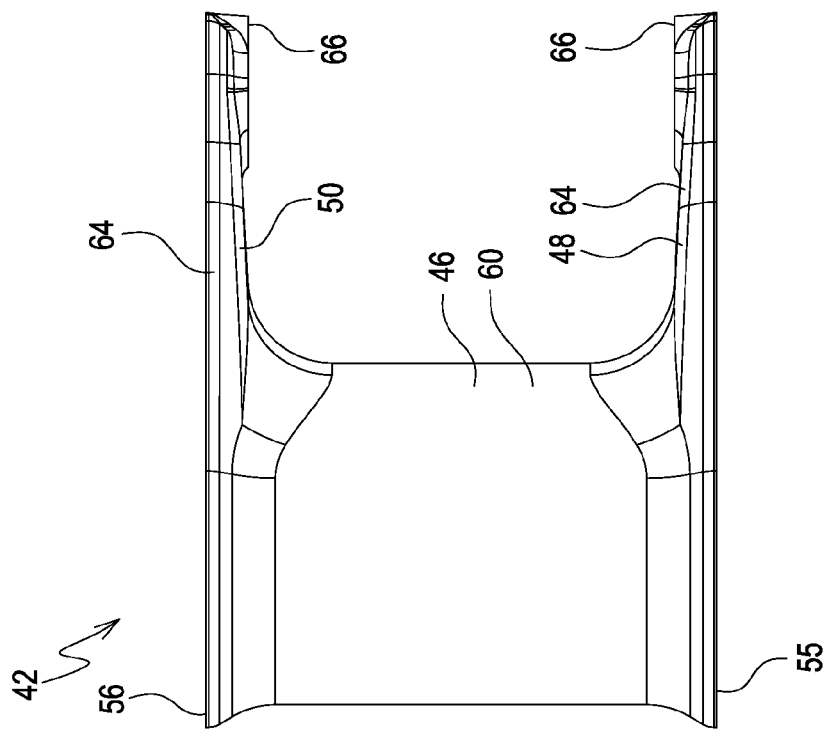
FIG. 7 is a top view of the knuckle body.
Figure 9:
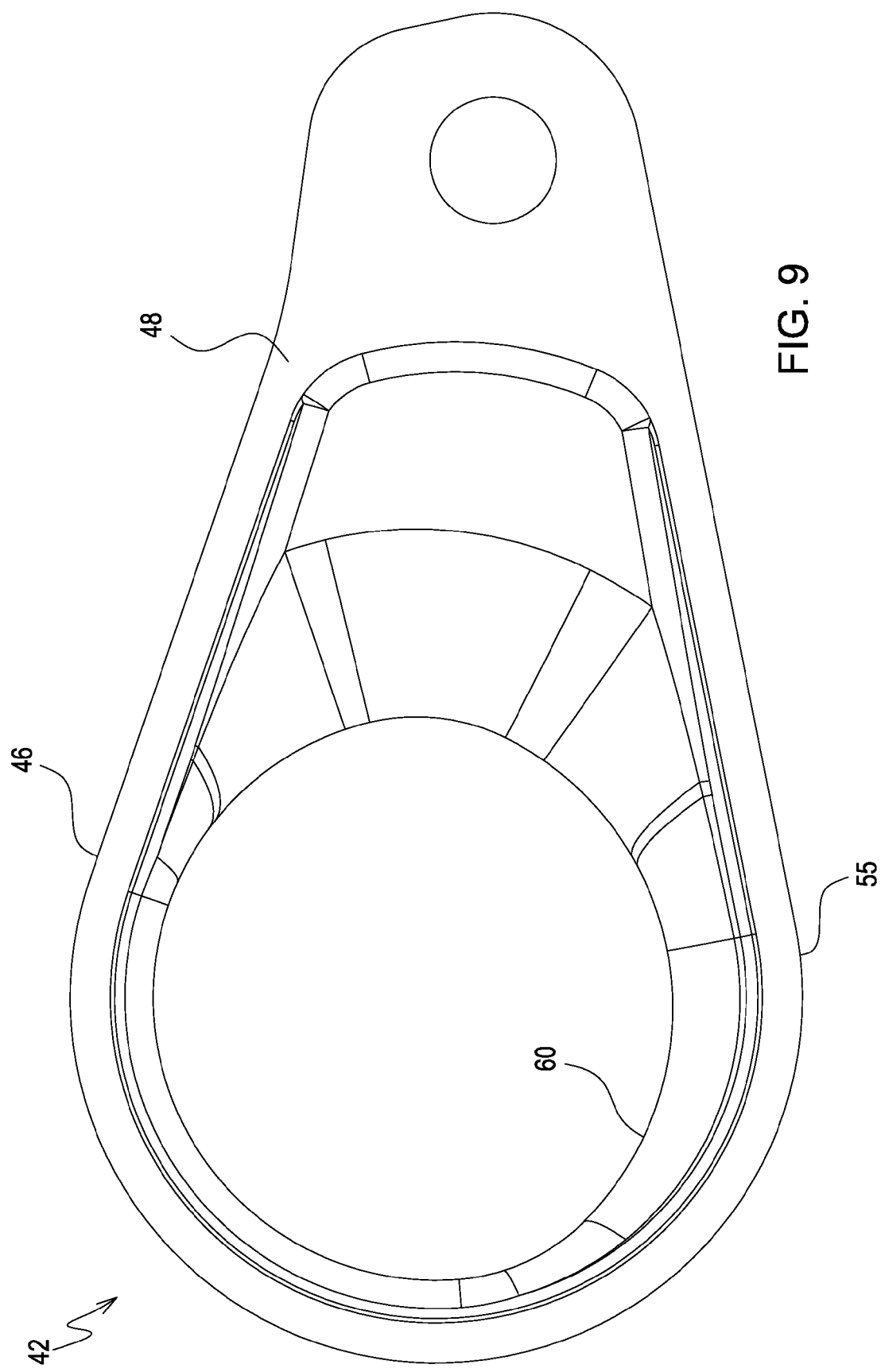
FIG. 9 is a side elevation view of the knuckle body.

Referring to FIGS. 2-4, as alluded to above, the first boom 18 and the second boom 20 are attached pivotally to one another at the knuckle 21 by use of the clevis pin 23. The clevis pin 23 is fixed to the first boom 18 against movement relative thereto. At a first end portion of the clevis pin 23, a circular boss plate 80 is welded to the first wall extension 40, a washer 82 is positioned on the clevis pin 23, and a nut 84 is threaded onto the end of the clevis pin 23 against the washer 82 so as to press the washer 82 against a shoulder of the clevis pin 23. At a second end portion of the clevis pin 23 opposite to the first end portion of the clevis pin 23, a teardrop-shaped boss plate 76 is welded to the second wall extension 41, a flag plate 78 is welded to the clevis pin 23, and an anti-rotation bolt 79 (e.g., hexagonal socket head type) is positioned in an unthreaded hole of the flag plate 78 and extends through the boss plate 76 into the second wall extension 41 so as to be threaded to the second wall extension 41 (it may also be threaded to the boss plate 76). As such, the anti-rotation bolt 79 blocks rotation of the pin 23 about the axis of the pin 23.

The second boom 20 is attached pivotally to the first boom 18 via the clevis pin 23. The second boom 20 comprises a generally cylindrical casting 86 and a box structure 88 welded to the casting 86. The box structure 88 comprises a first side wall 90, a second side wall 91 spaced apart from the first side wall 90 laterally of the second boom 20, a top wall 92, and a bottom wall (not shown) spaced apart from the top wall 92 depth-wise of the second boom 20. The top wall 92 and the bottom wall interconnect and are welded to the first side wall 90 and the second side wall 91. The first side wall 90, the second side wall 91, the top wall 92, and the bottom wall cooperate to define a periphery of the box structure 88. The top wall 92 and bottom wall of the box structure 88 are welded to the casting 86. Each of the first and second side walls 90, 91 of the second boom 20 has a ring-shaped lug 93 surrounding and welded to the casting 86.

The knuckle 21 comprises two bushings (not shown). The bushings are positioned on the clevis pin 23 at about the axial position of the lugs 93 relative to the clevis pin 23 so as to surround the clevis pin 23. The casting 86 is positioned on the bushings so as to surround the bushings. The bushings are thus positioned between the clevis pin 23 and the casting 86 to facilitate pivotal movement between the first and second booms 18, 20.

As alluded to above, the work machine 10 may be a tracked feller buncher, comprising a boom apparatus comprising a first boom similar in design to the first boom 18 (although dimensions and proportions may be different). A difference is that the first boom of the tracked feller buncher may have two lug plates for mounting the hoist cylinders and the stick cylinder to the first boom, the lug plates extending through the bottom wall of the box structure into the interior region of the box structure and each comprising an end edge welded to the barrel of the anchor body.

U.S. patent application Ser. No. 13/236,935, filed 20 Sep. 2011, and U.S. patent application Ser. No. 13/693,373, filed 4 Dec. 2012, are hereby incorporated by reference herein.

The welds and any threads have not been shown in the drawings for simplification of illustration, it being understood that it would be well within the skill of one of ordinary skill in the art to provide those features without undue experimentation.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the appended claims.

What is claimed is:

1. A boom apparatus, comprising
a clevis pin, and
a first boom, and
a second boom, the first boom and the second boom attached pivotally to one another at a knuckle of the boom apparatus by use of the clevis pin,
the first boom comprising
a first side wall,
a second side wall spaced apart from the first side wall laterally of the first boom,
a top wall,
a bottom wall spaced apart from the top wall, the top wall and the bottom wall interconnecting the first side wall and the second side wall, the first side wall, the second side wall, the top wall, and the bottom wall cooperating to define a periphery of a box structure of the first boom, the first side wall and the second side wall extending longitudinally of the first boom beyond the box structure to provide respectively a first wall extension and a second wall extension, and
a monolithic knuckle body positioned at a knuckle end portion of the first boom, the knuckle body attached to and sandwiched between the first and second wall extensions, the knuckle body comprising a barrel, a first body ear, and a second body ear, the barrel attached to the top and bottom walls and the first and second wall extensions so as to close an end portion of the box structure, the first body ear and the second body ear extending from the barrel longitudinally of the first boom respectively along the first wall extension and the second wall extension, the clevis pin received in a first pin-receiving bore defined at least partially in the first body ear and the first wall extension and a second pin-receiving bore defined at least partially in the second body ear and the second wall extension such that the knuckle body, the clevis pin, and the first and second wall extensions are included in a clevis of the knuckle.

2. The boom apparatus of claim 1, wherein the knuckle body is a casting.

3. The boom apparatus of claim 2, wherein the casting is a shell casting.

4. The boom apparatus of claim 1, wherein the barrel is generally spool-shaped.

5. The boom apparatus of claim 1, wherein the barrel comprises a first barrel end portion, a second barrel end portion spaced axially apart from the first barrel end portion relative to a central axis of the barrel, and a tubular portion interconnecting the first and second barrel end portions, the first barrel end portion is welded to the first wall extension, the second barrel end portion is welded to the second wall extension, and the tubular portion is welded to the top and bottom walls.

6. The boom apparatus of claim 1, wherein the first and second body ears extend parallel to one another in a common direction from the barrel.

7. The boom apparatus of claim 6, wherein the first and second body ears taper as they extend in the common direction from the barrel.

8. The boom apparatus of claim 7, wherein each of the first and second body ears comprises a web that tapers as it extends from the barrel and a collar that is distal from the barrel and protrudes laterally inwardly from the web laterally of the first boom, the collar of the first body ear cooperates with the first wall extension to define the first pin-receiving bore, and the collar of the second body ear cooperates with the second wall extension to define the second pin-receiving bore.

9. The boom apparatus of claim 8, wherein the barrel comprises a tubular portion welded to the top and bottom walls, a first flared end portion extending radially from and circumferentially about the tubular portion and welded to the first wall extension, and a second flared end portion extending radially from and circumferentially about the tubular portion and welded to the second wall extension, the web of the first body ear merges with and extends from the first flared end portion, and the web of the second body ear merges with and extends from the second flared end portion.

10. The boom apparatus of claim 1, further comprising at least one flexible line routed through a passageway defined between the barrel and the clevis pin and between the first and second body ears.

* * * * *